July 8, 1969  J. F. HOWARD  3,454,917
OVERCURRENT PROTECTIVE DEVICE FOR ELECTRICAL APPARATUS
Filed Oct. 6, 1967  Sheet 1 of 3

INVENTOR.
JOHN F. HOWARD
BY
David M. Schiller
ATTORNEY

July 8, 1969  J. F. HOWARD  3,454,917
OVERCURRENT PROTECTIVE DEVICE FOR ELECTRICAL APPARATUS
Filed Oct. 6, 1967  Sheet 2 of 3
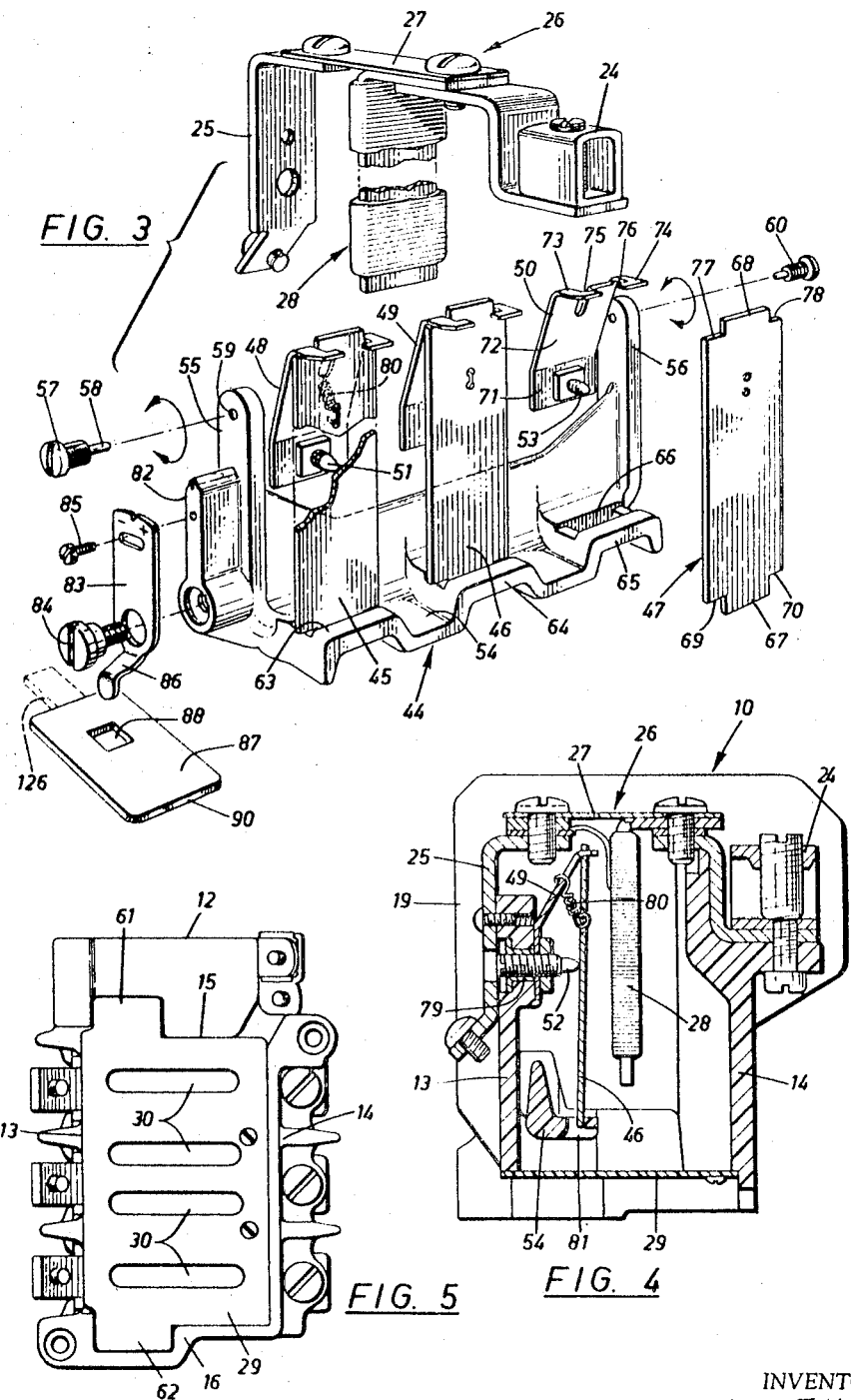
INVENTOR.
JOHN F. HOWARD
BY
David M. Schiller
ATTORNEY

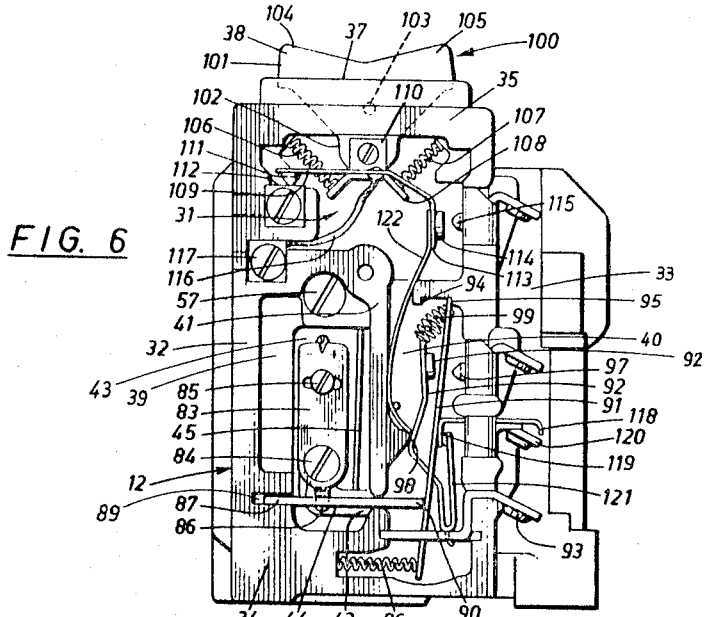
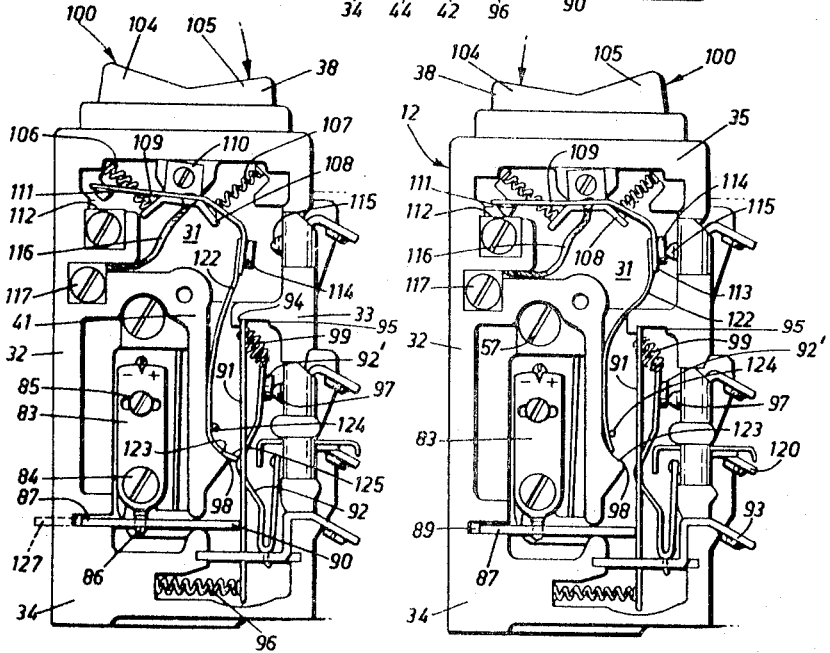

United States Patent Office 3,454,917
Patented July 8, 1969

3,454,917
OVERCURRENT PROTECTIVE DEVICE FOR ELECTRICAL APPARATUS
John F. Howard, Peterborough, Ontario, Canada, assignor to Canadian General Electric Company, Limited, Toronto, Ontario, Canada, a company of Canada
Filed Oct. 6, 1967, Ser. No. 673,458
Claims priority, application Canada, Dec. 28, 1966, 979,045, 979,046
Int. Cl. H01h 71/16, 61/04
U.S. Cl. 337—39        34 Claims

ABSTRACT OF THE DISCLOSURE

A unitary overcurrent protective device for protecting multiphase electrical apparatus such as three phase AC motors, includes two or more bimetallic elements operable individually for moving a common carrier to operate a switching mechanism in response to overcurrents in any one or more of the phases. The switching mechanism has contacts for controlling a magnetic contactor associated with the protective device. The protective device also includes a manually operated switch having contacts separate from the switching mechanism contacts for manually controlling the contactor. The manually operable switch has neutral, ON and OFF positions, and is effective when operated to its OFF position to reset the switching mechanism.

Background of the invention

Electromagnetic contactors for electric motors are usually equipped with overload actuated devices designed to protect the motor from damage due to excessive currents caused by overloads, defects, or stalled rotor. These devices are generally referred to as overload relays, and at least two relays are used to protect a three-phase motor. The current sensitive element in the type of relay to which this invention applies is a bimetallic strip which deflects when heated in accord with the motor current and operates a switching mechanism when the current becomes excessive. The bimetallic strip is heated by all or a definite proportion of the current to the motor either directly by passing the current through the strip, indirectly by passing the current through a heater located near the strip, or by a combination of the two means. It has been common practice to use two or three separate relays to protect a three phase load such as an induction motor, with each relay having its own overcurrent and switching units. This is a costly and space consuming approach and more recently effort has been made to provide a complete unit which combines two or more bimetallic overcurrent units with one switching unit for protecting a multiphase load against overloads. An example of such combined device is found in U.S. Patent 3,265,831.

Moreover, the combination of separate overload relays and a magnetic contactor generally has associated therewith a manually operated switch for energizing and deenergizing the contactor for starting and stopping the motor. This overall combination ordinarily comprises a large number of separate components which must be wired together as a starter assembly either at the factory or when the equipment is installed in association with a machine. The assembly of prior art starter designs has involved costly and time consuming operations and the starters themselves have been of costly and bulky design.

Objects of the invention

It is therefore a primary object of the invention to provide a novel and improved overcurrent protective device for protecting electrical apparatus.

It is another object of the invention to provide a novel and improved unitary overcurrent protective device for protecting multiphase electrical apparatus which combines two or more overcurrent units with one switching unit having contacts for controlling an associated contactor.

It is a further object of the invention to provide a unitary device as defined in the preceding object also including a manually operated switch which has contacts separate from the switching unit contacts for manually controlling the contactor, and which is effective when manually operated to its "off" position to reset the switching unit.

Summary of the invention

In carrying out the invention in one preferred form, a unitary current responsive device includes two or more bimetallic strips loosely retained by their ends between fixed supports and a single carrier which is freely movable by deflection of one or more of the strips. A stop located at one side of each strip intermediate its ends cooperates with the fixed support to restrain deflection of the strip upon being heated to movement of the end supported on the carrier. The bimetallic strips are biased against their respective stops, and the carrier is operatively connected to a switching mechanism adapted to be tripped by movement of the carrier a definite amount to open a pair of contacts for deenergizing an associated contactor. Each bimetallic strip deflects independently of the others upon being heated, and this deflection is translated into movement of the carrier to trip the switching mechanism. The operative connection between the carrier and the switching mechanism includes a member adjustably mounted on the carrier to provide a tripping point adjustment. The device further includes a three position manually operable member for opening and closing two pairs of contacts separate from the contacts of the switching mechanism for manually controlling the contactor. The manually operable member includes a neutral position and momentary "on" and "off" positions. A linkage connects the manually operable member with the switching mechanism for resetting the switching mechanism after it has operated in response to an overcurrent condition.

Other objects and advantages of the invention will become apparent from the following description taken in conjunction with the accompanying drawings in which:

Brief description of the drawing

FIGURE 3 is an exploded view in perpsective of the bimetallic strips and the supports therefor;

FIGURE 4 is a section in elevation taken along the line A—A of FIGURE 1;

FIGURE 5 is a view in bottom plan of the device; and

FIGURES 6, 7 and 8 are views of the device with parts removed showing the switching mechanism and the manual switch with their contacts in different positions.

Description of a preferred embodiment

Figure 1:
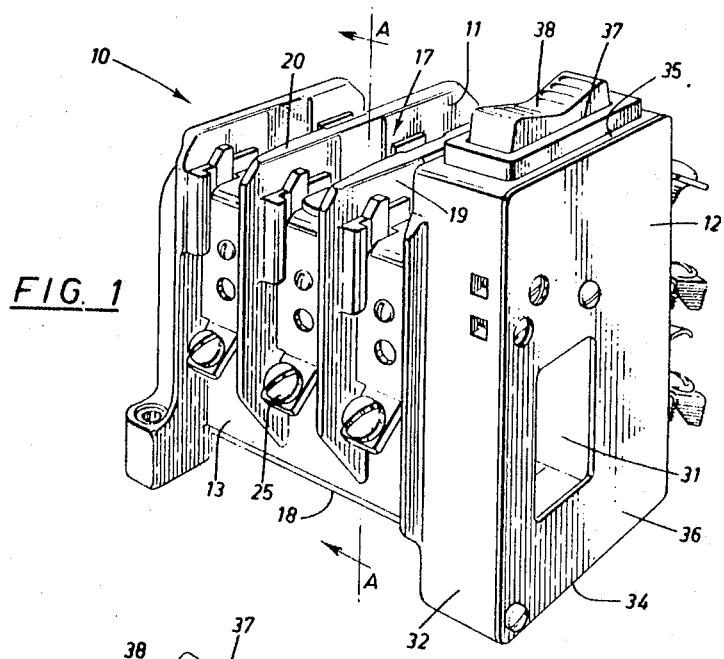
FIGURES 1 and 2 are perspective views of an overcurrent protective device constructed according to the invention.

The drawings illustrate a three phase overcurrent protective device for use with a magnetic contactor for controlling three phase apparatus such as an AC motor. This device has three separate bimetallic strips, one for each phase, supported in relation to a movable common member or carrier so that the carrier is moved by deflection of one or more of the strips, a switching mechanism tripped in response to movement of the carrier, and a manually operated switch for resetting the switching mechanism and also for manually starting or stopping the motor. These components along with a casing therefor comprise a single complete unit.

Referring now to the drawings, in particular FIGURES 1, 2, 4, and 5, there is shown a device 10 having a single casing in two sections 11 and 12 with section 11 housing the overload mechanism and section 12 housing the switching mechanism and a manual switch. Section 11 has a pair of side walls 13 and 14, a pair of end walls 15 and 16, and is open at the top 17 and bottom 18. Two partitions 19 and 20 terminating somewhat short of the bottom of section 11 divide the upper part of its cavity in three compartments 21, 22, and 23 which are in communication with the remaining lower portion of the cavity. These compartments are open at the top, and at the bottom they open into the lower cavity portion. A pair of terminals 24 and 25 are secured to side walls 13 and 14 at the upper end of compartment 22. These terminals have lugs on their outer ends for connection to one of the three power lines to the motor, and have a heater assembly 26 connected across their inner ends. The heater assembly has a strip 27 of insulating material (FIGURES 3 and 4) bridging the contacts so as to substantially close the top of the compartment. A resistance heater 28 hangs down from the strip 27 well into the compartment 22 and is connected to the terminals 24 and 25 so the line to motor current flows through the heater. A similar terminal and heater combination is provided for each of the compartments 21 and 23 for connection into the other two lines. In the event that only two heaters are used, as is sometimes done, a conductive bridge is placed across the third set of terminals. The open bottom 18 is closed by a cover 29 having openings 30 therein for ventilation of the three compartments. These openings reduce heat transfer from one compartment to another.

Figure 2:
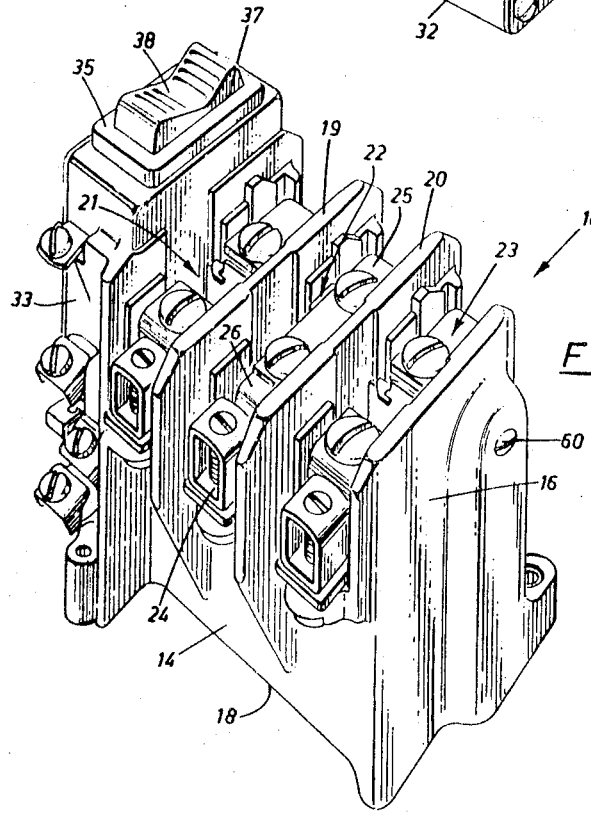

Casing section 12 is located at the end of section 11 outside its wall 15. As best seen in FIGURES 1, 2 and 6, it has an open cavity 31 defined by wall 15, side walls 32 and 33, bottom wall 34 and top wall 35. The main opening to the cavity 31 is at one end of the casing and it is closed by a cover 36. There is also an opening 37 in the top wall 35 for a switch operator 38. The casing, exclusive of covers, is moulded in one piece from a strong resinous material having good dimensional stability and electrical insulating properties. The covers and operator are also made of insulating materials.

Referring now to FIGURE 6, it will be seen that cavity 31 is divided into two compartments 39 and 40 by an inverted L-shaped wall 41 which projects from wall 15 and is united with side wall 32 and bottom wall 34 except for a slot 42 in it near the bottom wall. An enlarged opening 43 in wall 15 brings compartment 39 into communication with that portion of the cavity in section 11 lying below partitions 19 and 20.

In accord with one aspect of the invention an improved thermal overload mechanism is provided which will now be described with reference to FIGURES 3 and 4. It consists essentially of a movable common member or carrier 44, three bimetallic strips 45, 46, and 47, three bimetal supports 48, 49 and 50, and three stops 51, 52 and 53, one stop for each of the three bimetallic strips. Carrier 44 has an elongated mid portion 54 terminating in a pair of arms 55 and 56 extending to one side of the mid portion. The carrier is located in the cavity of section 11 with its mid portion spaced a little below partitions 19 and 20 near side wall 13 and transverse to end walls 15 and 16, and with its arms 55 and 56 extending upward along side wall 13 and end walls 15 and 16 respectively spaced from the three walls. The upper free end of arm 55 is pivotally supported on end wall 15 by means of a screw 57 which has its shank threaded into a hole in the wall 15 and has a small tip 58 fitting freely into a hole 59 in the arm. The upper free end of arm 56 is pivotally supported on end wall 16 in the same way by means of a screw 60 which is threaded into a hole in the wall 16 and has its tip fitting freely into a hole in the arm. Sufficient clearances are left between the carrier 44 and the walls of the casing that the carrier is free to swing a limited amount either way on its pivots. In the overcurrent mechanism illustrated, the arms of the carrier are actually located in recesses in end walls 15 and 16; these recesses are a continuation of side wall 13 as shown at 61 and 62 in FIGURE 5. The recesses are deep enough that the carrier can swing freely and wide enough to allow for the limiting swinging movement necessary. By placing the arms of the carrier in recesses, it is possible to make compartments 21 and 23 the same size and shape as compartment 22; the advantage of this will become apparent later.

In the preferred form of the invention, the bimetallic strips are loosely supported by the carrier 44. To this end, the mid portion 54 of the carrier has three formations spaced along its length between the arms directly opposite the open bottoms of the three compartments 21, 22, and 23 respectively. These formations consist of three raised portions 63, 64 and 65, each of which has a slot in its upper surface as indicated at 66 for the raised portion 65 shown in FIGURE 3. The three slots are aligned lengthwise of the carrier mid portion, and the size of each is such that it will loosely hold the lower end of a bimetallic strip, allowing for some lateral movement thereof. This also allows the lower end of the strip to pivot freely in the slot. In the carrier-bimetallic strip arrangement shown in FIGURE 3, each strip has a short length at both ends of reduced width. This is clearly illustrated at 67 and 68 on strip 47. Slot 66 is wider than the thickness of the bimetal and a little longer than the width of the strip at its end 67. The end 67 fits loosely into a slot 66 and the shoulders 69 and 70 on either side of this end rest on the upper surface of the raised portion 65. In effect, the bimetallic strip stands upright on the carrier, the shoulders transmitting the weight of the strip to the carrier and the slot restraining movement of the strip. The slot is wide enough that the strip can move from side to side and pivot on its shoulders 69 and 70. The lower end of strips 45 and 46 are supported on the carrier in exactly the same way.

In order to support the upper ends of the three bimetallic strips, the supports 48, 49, and 50 are provided, each comprising a metal strip of the angular configuration shown in FIGURES 3 and 4 and now to be described with reference to support 50 shown in FIGURE 3. The support 50 is located inside compartment 23 and has its lower end portion 71 secured to casing side wall 13 about midway of the length of the compartment. It has a relatively long midportion 72 which projects upwardly and away from wall 13 to a point near the open top of the compartment where it terminates in bifurcated end portions 73, 74 located a little below the heater support and directly opposite formation 65 in vertically spaced relation thereto. While the upper ends of the bimetallic strips may be rigidly supported by the supports 48, 49, and 50, they are preferably loosely supported by the supports. For this purpose, the end portions 73 and 74 of the supports are notched or slotted on their confronting inner edges at 75 and 76 respectively. The upper end 68 of bimetallic strip 47 fits loosely into notches 75 and 76 with some vertical clearance between shoulders 77, 78 and the bifurcated end portions 73 and 74 respectively. Each of the three bimetallic strips is held between the carrier and a support such that it has some freedom of lateral and longitudinal movement and is capable of extensive pivotal movement on its shoulders. Hence the strips may be considered to be loosely held between the carrier and the supports. Each support is secured to side wall 13 as shown in FIGURE 4 by a tubular rivet 79 passing through a hole in the wall and a hole in the lower end of the support so as to clamp the lower end of the support to the wall. The wall is thicker in this region and has a ridge at the end of the support to keep the support from turning on the rivet.

Bimetallic strips 45, 46, and 47 are identical flat strips of bimetal of the shape shown for strip 47 in FIGURE 3.

Strip 45 is located in compartment 21 lengthwise thereof in spaced relation to its walls and much nearer side wall 13 than wall 14. Strip 46 is located in compartment 22 and strip 47 in compartment 23 in the same way. The three strips are in an edge-to-edge row between the arms of the carrier and have their high expansion sides facing side wall 13. The strips when undeflected define a plane which is perpendicular to the end walls 15 and 16 and the carrier 44 is mounted for pivotal movement about an axis which is parallel to the plane of the strips. Further, the axis of pivotal movement of the carrier and the heaters 28 are located on opposite sides of the plane defined by the bimetal strips.

Identical stops 51, 52, and 53 are provided for bimetallic strips 45, 46, and 47 respectively, the stop 52 being shown in FIGURE 4 in the form of the tip of a headless screw threaded into tubular rivet 79. The tip of the screw abuts the high expansion side of strip 46 on its longitudinal center line approximately midway of its length, and the other end of the screw has a slot accessible for receiving a screw driver from outside the casing. In some instances a coil spring 80 may be used to bias the middle of the strip against the tip of the screw and the upper end of the strip against support 49. A spring such as the spring 80 is usually unnecessary because the bimetallic strip deflects against a force exerted by the switching mechanism as will appear hereinafter. When a spring is used, one end is hooked to the mid portion of the support through a pair of small holes in the support, and the other end is hooked to the bimetallic strip in the same way at a point on its center line between the stop and the upper end of the strip. When one of the bimetallic strips deflects from heating, its lower end is the only part free to move and this movement will be to the right as viewed in FIGURE 4. As a result, deflection of the strip will drive the carrier to the right, swinging on its pivotal axis which extends perpendicular to the plane of the paper. Screw 52 is also used for the initial calibration of strip 46, i.e., to place the strip in a specific relation to the carrier, after which its slotted end is sealed to the casing by means of a drop of wax. Strips 45 and 47 are biased and calibrated and operate in exactly the same way as strip 46. Since each strip can deflect independently of the others in response to heating, the deflection of any one or more of the strips will cause the carrier to swing to the right. When springs such as the spring 80 are used, the width of the slots in the carrier mid portion is made much greater than the thickness of the bimetal so as to provide a lost motion linkage between each strip and the carrier. If one strip is now heated more than the others, it will deflect to a greater extent and drive the carrier with it free from the other strips. In other words, the cooler strips will not impede movement of the carrier, nor will movement of the carrier interfere with deflection of the cooler strips. This is illustrated at 81 in FIGURE 4 where it can be seen that the slot is so wide that the carrier can swing to the right while strip 46 remains in its present position. Cooling of the strips will, of course, cause them to deflect to the left, and the carrier will follow because it is actually biased to the left by the switching mechanism.

When no springs 80 are used, the slots in the carrier mid portion need not be of the width shown at 81 in FIGURE 4; they need only be wide enough to loosely hold the ends of the bimetallic strips as with supports 48, 49, and 50. With no springs urging the strips against their stops, there is no need for the lost motion linkage because a strip that is not deflecting sufficiently to drive the carrier to the right is simply floating along with the carrier doing no work itself nor impeding the work done by other strips. However, while such is unnecessary, there is no particular disadvantage in having this linkage even though no springs are used.

In accord with a further aspect of the invention, improved means is provided to adjust the tripping point of the switching mechanism. The adjustment comprises a part mounted on the carrier 44 for limited adjustment relative to the carrier. In the specific embodiment illustrated, arm 55 of carrier 44 has an extension 82 (FIGURE 3) which projects through opening 43 in wall 15 into compartment 39 in casing section 12 as shown in FIGURE 6, and a metal bracket 83 is fastened to the outer end of the extension by means of a pair of screws 84 and 85. The lower end of the bracket 83 has a small tip or projection 86 projecting loosely into a hole 88 in a rectangular plate member 87 which is loosely supported in slot 42 and in a recess 89 in wall 32 for free sliding movement along wall 15 in response to swinging movement of the carrier. The right hand end 90 of this member rests inside compartment 40 in operating relation with the switching mechanism. It will be noted from inspection of FIGURE 3 that bracket 83 is capable of angular adjustment relative to the carrier about the axis of screw 84 as the hole in the bracket for screw 85 is slotted. Angular adjustment of the bracket 83 effects adjustment of the projection 86 generally in the direction of movement of the plate 87. To effect the adjustment, screw 85 is loosened and the bracket is pivoted about screw 84 to the desired position. The screw 85 is then tightened to secure the bracket in its adjusted position. This adjustment is useful in the initial calibration of the device for setting the tripping point of the switching mechanism to a given travel of the carrier from deflection of the bimetallic strips. Or, in other words, it enables the tripping point of the switching mechanism to be set for given overcurrent conditions.

The location of heater 28 in compartment 22 shown in FIGURE 4 is typical of all three heaters. The heater 28 is located between the bimetallic strip and side wall 14 spaced from the three adjacent walls of the compartment. It has one broad side facing the lower expansion side of the strip spaced therefrom so as not to interfere with deflection of the strip, and it terminates well above the carrier. The walls of the cavity next to the heater may be lined with a heat reflecting material such as aluminum foil to reflect heat striking them back onto the strip. The foil lining also reduces heat transfer from one cavity to another and to other parts of the device. By having the three compartments nearly the same size as pointed out earlier, it is possible to place all three bimetallic strips in the same thermal environment, and therefore obtain a better balance in performance. The partially open top of casing section 11 and the apertured bottom cover 29 permit a limited amount of air to pass through the compartments over the strips and heaters, allowing for some independent cooling of a compartment.

Referring now to FIGURES 6, 7, and 8, end 90 of sliding member 87 actuates a switching mechanism located in the lower portion of cavity 31 when the member 87 is moved to the right by deflection of one or more of the bimetallic strips from their normal undeflected positions. This particular switching mechanism is described in United States Patent No. 3,038,051, issued June 5, 1962 to J. F. Howard. It controls a first pair of contacts and consists essentially of a frame 91 adapted to cause movement of a contact arm 92 and its contact 92' between "contact make" and "contact break" positions. Frame 91 is formed from a thin strip of resilient spring-like material into a rectangular form having a large window therein. The frame is pivotally supported on a terminal 93 for movement about an axis perpendicular to the plane of the paper such that the major portion of the length of the frame stands upright on the terminal and can oscillate on this axis between stops 94 and 95. A minor portion of the frame hangs down below the terminal and is biased for counterclockwise rotation by means of a coil spring 96. Terminal 93 is trapped in recesses in the casing, and contact arm 32 also stands upright on terminal 93, where it is held loosely for pivotal movement through the window in the frame between fixed contact 97 and stop 98. A coil spring 99 compressed between the upper end of the contact arm and the upper inner end of the frame cooperates with the frame and arm in forming an over-center snap acting mechanism. When the frame swings from its position in FIGURE 6 wherein it engages stop 95 to its position in FIGURE 7 wherein it engages stop 94, initially its motion compresses spring 99, and, as the frame passes its over-center position in relation to the arm, the spring takes over and snaps the arm in the opposite direction from stop 98 to move the contact 92′ into engagement with fixed contact 97. This completes a circuit between terminals 97 and 93, and it is the normal contact position for normal operation of the motor. When the frame swings from stop 94 to stop 95, the contact arm swings the other way from contact 97 to stop 98 with an over-center snap action as before. It is to be noted that swinging of the frame from stop 95 to stop 94 is aided by spring 96 and swinging the other way from stop 94 to stop 95 is against the bias of spring 96.

Movement of frame 91 from stop 94 to stop 95 is accomplished through movement to the right of the sliding member 87 as its end 90 bears against the frame at a point a little above terminal 93. Hence operation of the switching mechanism from "contacts closed" to "contacts open" is effected through overheating of one or more of the bimetallic strips 45, 46, or 47 in response to an overcurrent condition in the motor circuit. The heating of the strips causes them to deflect and drive carrier 44 to the right, the carrier in turn driving member 87 to the right to drive the frame clockwise about its pivoted axis against the bias of spring 96. Tripping of the switching mechanism through deflection of the bimetallic strips always takes place against the bias of spring 96. The means employed for closing the contacts after having been opened automatically due to an overcurrent condition is known as resetting the switching mechanism and will be described hereinafter.

It is sometimes desirable to open the contacts of the switching mechanism manually as a test to check that the contact 92′ on arm 92 is not welded to contact 97. This device can readily be adapted for such checking by simply extending a narrow portion on the left end of sliding member 87 to the left out through a clearance hole in wall 32 of the casing. The extension will project far enough outside the wall that it can be pushed manually to the right to trip the switching mechanism, and thereby check the condition of the contacts. This extension is illustrated at 126 in FIGURE 3 and its left end is shown at 127 in FIGURE 7 projecting outside casing wall 32.

If it is desired to compensate the overcurrent device for ambient temperature conditions, as it often is, this can be done by replacing frame 91 with a similar frame made from a suitable bimetal, and placing the bimetallic frame in the switching mechanism with its low expansion side facing to the left. Elevated ambient temperatures will now cause the frame to bow to the right while the lower ends of the main bimetallic strips deflect to the right, thereby maintaining the original, or a newly established, operational relation between the main bimetallic strips and the switching mechanism. Ambient compensation well suited for use in this particular device is described in detail in United States Patent No. 3,015,007, issued Dec. 26, 1961, to J. F. Howard.

In accord with a further aspect of the invention, the unitary protective device includes means for energizing or deenergizing the magnetic contactor to start or stop the motor and also for resetting the switching mechanism. Such means is shown in FIGURES 6, 7 and 8 and comprises a manual switch 100 having an operator 38 located in opening 37 of wall 35 with a portion 101 protruding outside the wall and another portion 102 extending into compartment 31. Operator 38 is supported on the wall on pivot means 103 transverse to the wall for limited rocking motion in the direction of either wall 32 or wall 33, depending on which one of the operator surfaces 104 or 105 is depressed. Surfaces 104 and 105 are adapted for depression by a finger of a person. As indicated in FIGURES 7 and 8, the operator is respectively in its "off" position when surface 105 is depressed and in its "on" position when surface 104 is depressed. The pivotal means comprises a pair of mating bearing surfaces on either side of the operator arranged such that the operator is inserted into the opening from outside the casing and held in place by means of a pair of compression springs 106 and 107 urging the bearing surfaces together. Spring 106 is partially compressed between the inside of wall 35 at a point near wall 32 and one leg of an angle bracket 108 secured to the inner end portion 102 of the operator. Spring 107 is partially compressed between the inside of wall 35 at a point near wall 33 and the other leg of bracket 108. The two springs hold the operator in its bearings in the neutral position shown in FIGURE 6 and return it to the neutral position after an "on" or an "off" operation has been performed and the operator is released. Stops limit rocking of the operator to a relatively small movement either way from the neutral.

A strip 109 of a resilient, spring-like, conductive metal is also secured to end portion 102 of the operator at a point approximately midway of the length of the strip. Both the strip 109 and the bracket 108 have right angular portions 110 which are fastened to operator portion 102 by means of a screw driven into portion 102 from the open side of casing section 12. The strip is on edge across compartment 31, extending from near wall 32 to near wall 33, and its flat sides move up or down with rocking motion of the operator. Its left end is straight and carries a movable contact 111 of a second pair of contacts, the contact 111 being biased by the strip into engagement with a stationary contact surface 112 for both "neutral" and "on" positions of the operator but breaks with the surface in the operator "off" position. Contact 111 slides along surface 112 as the operator rocks from its "neutral" to its "on" position and back again to "neutral." The right end of the strip next to attachment 110 is bent down at an angle of about 45° and then straight down so as to terminate in a short end portion 113 parallel to wall 33 but spaced therefrom. End portion 113 carries a movable contact 114 of a third pair of contacts, the contact 114 engaging a stationary contact 115 only when the operator is in its "on" position and being otherwise separated from contact 115. A flexible lead 116 connects the contact strip to a terminal 117. As shown respectively in FIGURES 6, 7, and 8, contacts 111, 112 are made and contacts 114, 115 are broken when the operator is in its "neutral" position, both sets of contacts 111, 112 and 114, 115 are broken when the operator is in its "off" position, and both sets of contacts 111, 112 and 114, 115 are made when the operator is in its "on" position. In the neutral position of the operator a circuit is completed from terminal 117 to terminal 112 through lead 116, strip 109 and contact 111. In the "off" position of the operator no circuit is completed, and in the "on" position a circuit is completed from terminal 117 to terminals 112 and 115 through lead 116, strip 109 and contacts 111 and 114. These circuits may be applied in known ways for controlling the energization and deenergization of the magnetic contactor used for starting or stopping the motor. For example, contacts 92′, 97, contacts 111, 112, and contacts 114, 115 may all be in series with the winding of the contactor across a power source, and a pair of normally open sealing contacts which close when the contactor winding is energized may be connected in shunt with the contacts 114, 115.

Resetting of the over-center snap acting switching mechanism composed principally of frame 91, contact arm 92, spring 99 and terminal 93 will now be considered in connection with FIGURES 6, 7, and 8. Every time that contacts 92, 97 are opened by thermal overload mechanism due to motor overcurrents, the magnetic contactor is made to shunt down the motor. These contacts must therefore be closed again before the motor is returned to service. This can be done either automatically or manually, most frequently manually.

Automatic resetting is made possible by a slide 118 having a downwardly projecting stop 119 on its left end and supported on a terminal 120 for limited sliding movement left or right against a significant amount of friction between the slide and the terminal. The slide is moved manually between an extreme left position and an extreme right position. Terminal 120 is clipped onto casing wall 33. In the extreme left position of the slide as viewed in FIGURES 6, 7, and 8, the stop does not interfere with movement of the auxiliary arm 121 on contact arm 92 during full over-center travel thereof makes with the arm at the very end of the travel as shown in FIGURE 6. By having the stop and auxiliary arm make in this way, it is possible to use them in an auxiliary circuit to indicate the state of the contacts of the switching mechanism. When slide 118 is set in its extreme right position, stop 119 stops movement of the contact arm before it reaches its over-center position; as a result, the arm simply returns to close contacts 92', 97 once the bimetallic strips cool down again. With the stop set to prevent over-center operation of the contact arm, automatic resetting results. However, with the stop set for over-center operation of the contact arm, manual resetting is necessary. The features discussed in this paragraph are described fully in the aforementioned United States Patent No. 3,015,007.

In accord with the invention, manual resetting of the contacts of the switching mechanism is carried out by depressing operator 38 into its "off" position shown in FIGURE 7. During such operation the short end portion 113 of contact strip 109 moves down and causes a linkage 122 actuated by that portion to push contact arm 92 over-center from its open position to its closed position. Linkage 122 comprises a relatively long, narrow and thin strip of a strong, resilient insulating plastic material such as polyethylene terephthalate. The upper end of strip 122 is secured to portion 113 and the strip extends down therefrom along the vertical part of wall 41 with one flat side of the strip bearing against the wall and a guide surface 123 thereon which curves away from the wall toward the mid portion of contact arm 92 and terminates in stop 98. A guide pin 124 holds the strip against the guide surface and allows it to move freely along the surface. When the operator is depressed to its "off" position, the lower end 125 of the strip 122 is deflected to the right by means of guide surface 123 against the back of arm 92, thereby driving the arm to the right a little beyond its over-center point, after which spring 99 takes over, snapping the arm fully to the right and frame 91 fully to the left. Once the operator is released, it returns to its neutral position and withdraws strip 122 to the position shown in FIGURE 6. Depressing the operator to its "on" position simply raises the strip to the position shown in FIGURE 8. The length of the strip is such that its end 125 does not interfere with movement of arm 92, except when the operator is in its "off" position, when it drives the arm clockwise to a point a little over-center. There is a hump on the back of the arm which strikes stop 98 to limit counterclockwise movement of the contact arm.

When contacts 92', 97 of the switching mechanism are closed, as they usually are for normal operating conditions, operator 38 can be depressed to its "on" position with the end 125 of strip 122 free from arm 92. During normal starting or stopping of the motor, the strip 122 simply moves with the operator, performing no useful function. After the contacts of the switching mechanism have been opened by the thermal overload mechanism, the motor will be stopped. To start the motor again, first the "off" side of the operator is depressed to reset the switching mechanism and then the "on" side is depressed to close contacts 111, 112 and 114, 115 to start the motor.

Ideally, in overload protectors for motors, fast tripping is wanted for sudden overloads great enough to harm the motor, but much slower tripping is wanted for the lesser overloads which the motor can stand for a limited time. The overload device should remove the motor from the line very quickly if its rotor stalls or fails to start, and it should also allow the motor to carry a moderate overload for a short time and yet remove the motor from the line, if the overload persists. Overload device 10 can be readily adapted for this kind of operation by making supports 48, 49, and 50 from a suitable bimetallic strip into the configuration shown in FIGURES 3 and 4, and placing them with their low expansion sides facing the high expansion sides of bimetallic strips 45, 46, and 47. With such arrangement, heat emanating from the heater causes the support 49 for example to deflect as well, but at a much lower rate than the bimetallic strip 46. In deflecting, the upper end of the support 49 moves to the right, which changes the upper pivotal axis of the strip 46 so it must now deflect farther to trip the switching mechanism. It will be seen from FIGURE 4 that the bimetallic strip 46 is located next to the heater, and that the bimetallic support 49 is farther from the heater and on the other side of the strip. One side of the strip is exposed to radiation from the heater and the heat reflecting lining in the compartment, but the support is shielded by the strip from much of this radiation. However, heat will find its way to the support, as, for example, through radiation and conduction from the strip, but at a much lower rate than to the strip. An increase in the current flowing in the heater will cause the strip to rapidly deflect, and a little later the support will also deflect. If the current is very high, as, for example, due to a stalled rotor of the motor, deflection of the strip will be fast enough and great enough that the switching mechanism will trip almost immediately without causing any significant deflection of the support, and thereby disconnecting the motor from its power source. If the increase in current is due to a moderate overload on the motor, the strip will, of course, deflect as before, but not as fast now because less current is flowing in the heater. This delay gives the support time to deflect, and in so doing delays tripping of the switching mechanism longer than would be possible with a support unable to deflect. By using the proper combination of bimetals in the strip and the support, fast tripping can be obtained on high overloads with much slower tripping on moderate overloads. In many motor applications, moderate overloads occur frequently, but unless such overloads last long enough to be harmful to the motor, tripping is not wanted. The feature discussed in this paragraph is described in detail in application Ser. No. 535,217 filed Mar. 17, 1966 by J. F. Howard.

In actual use of the overload device, the heaters are connected in the power supply to the motor. Consequently, the current flowing to the motor also flows through the heaters to cause heating thereof. Under normal load conditions the heat produced by the heaters is insufficient to operate the device, but if the current flowing in one or more of the heaters rises above a predetermined value, sufficient heat will then be produced to cause one or more of the bimetallic strips 45, 46, or 47 to deflect. The deflection of one or more of the strips causes carrier 44 to swing to the right and drive sliding member 87 to the right. As best illustrated in FIGURES 6, 7, and 8, the movement of member 87 to the right causes frame 91 to rotate clockwise. As frame 91 rotates clockwise spring 99 is compressed and its axis brought toward alignment with the plane of the frame, i.e., the spring enters the window in the frame. When the contact 92' on the upper end of arm 92 makes with contact 97, spring 99 exerts a component of force tending to keep the contacts closed, but continued rotation of the frame clockwise finally reverses this component of force, thereby causing arm 92 to rotate counterclockwise with over-center snap action until stopped in the left position shown in FIGURE 6. Since the frame is quite resilient, it simply bends from continued movement of member 87 to the right, thereby allowing for considerable overtravel of the main bimetallic strips. When contact 92' breaks with contact 97, the circuit holding the magnetic contactor energized is interrupted, and the motor is therefore stopped because the contacts of the contactor now open.

After tripping of the switching mechanism, contact arm 92 is reset from the open position shown in FIGURE 6 to the closed position shown in FIGURE 7 by means of the manual switch 100 by depressing its operator 38 to the "off" position. As the "off" side of the operator is depressed, strip 122 is driven down until its lower end 125 engages arm 92 and drives it clockwise. When the arm passes its over-center point with respect to the frame, it snaps to move contact 92' against contact 97 to reestablish the magnetic contactor circuit. The "off" side of the operator is now released and the "on" side depressed momentarily to re-start the motor.

Although the invention has been described with reference to certain specific embodiments thereof, numerous modifications are possible and it is desired to cover all modifications falling within the spirit and scope of the invention.

What I claim as new and desire to secure by Letters Patent of the United States is:

1. An overcurrent protective device for protecting electrical apparatus comprising in combination:
   a hollow casing,
   bimetal means mounted in said casing for deflection when heated,
   means in said casing for heating said bimetal means in accord with current supplied to the apparatus to be protected,
   switching mechanism in said casing operable in response to predetermined deflection of said bimetal means,
   a first pair of electrical contacts actuatable between first and second contact conditions in response to operation of said switching mechanism,
   means in said casing for operating said switching mechanism to actuate said first pair of contacts from their first condition to their second condition in response to deflection of said bimetal means resulting from an overcurrent condition,
   manually operable means mounted by said casing operable between a neutral position and ON and OFF positions,
   second and third pairs of electrical contacts actuatable between first and second conditions in response to operation of said manually operable means,
   said manually operable means when in its neutral position establishing the first condition of said second pair of contacts and the second condition of said third pair of contacts, when in its OFF position establishing the second condition of both said second and third pairs of contacts, and when in its ON position establishing the first condition of both said second and third pair of contacts, and
   means operatively connecting said manually operable means and said switching mechanism to reset said switching mechanism for actuating said first pair of contacts from their second condition to their first condition in response to operation of said manually operable means to its OFF position.

2. A device as defined in claim 1 wherein the first and second contact conditions of said first, second and third pairs of contacts are respectively closed and open conditions.

3. A device as defined in claim 1 wherein said manually operable means comprises a rocker spring biased to its neutral position and manually rockable against the spring bias in opposite directions from the neutral position to its OFF and ON positions, and
   a resilient conductive strip secured intermediate its ends to said rocker, said strip carrying at one end a movable contact of said second pair of contacts and carrying at its other end a movable contact of said third pair of contacts.

4. A device as defined in claim 3 wherein said means operatively connecting said manually operable means and said switching mechanism comprises a resilient insulating strip having one end secured to said conductive strip and having its other end free for engagement with a part of said switching mechanism in response to movement of said rocker to its OFF position.

5. A device as defined in claim 1 wherein said bimetal means comprises a plurality of separate bimetal elements,
   a plurality of supports secured to said casing each loosely supporting one end of a separate one of said bimetal elements,
   said means for operating said switching mechanism comprising a common member mounted by said casing for limited pivotal movement relative to said casing, said common member loosely supporting the other ends of said bimetal elements to be pivoted in response to predetermined deflection of any one of said bimetal elements, and
   means movable in response to predetermined pivotal movement of said common member for operating said switching mechanism.

6. A device as defined in claim 5 wherein said means movable in response to predetermined pivotal movement of said common member comprises a plate mounted by said casing for limited sliding movement relative to said common member and to said switching mechanism in directions perpendicular to the axis of pivotal movement of said common member, said plate having an opening therein,
   means mounted on said common member having a projection extending loosely into the opening of said plate to effect sliding movement of said plate in response to pivotal movement of said common member, and
   means for effecting limited adjustment of said projection relative to said common member generally in the directions of sliding movement of said plate to provide a tripping point adjustment.

7. A device as defined in claim 5 wherein said manually operable means comprises a rocker spring biased to its neutral position and manually rockable against the spring bias in opposite directions from the neutral position to its OFF and ON positions, and
   a resilient conductive strip secured intermediate its ends to said rocker, said strip carrying at one end a movable contact of said second pair of contacts and carrying at its other end a movable contact of said third pair of contacts.

8. A device as defined in claim 6 wherein said manually operable means comprises a rocker spring biased to its neutral position and manually rockable against the spring bias in opposite directions from the neutral position to its OFF and ON positions, and
   a resilient conductive strip secured intermediate its ends to said rocker, said strip carrying at one end a movable contact of said second pair of contacts and carrying at its other end a movable contact of said third pair of contacts.

9. A device as defined in claim 7 wherein said means operatively connecting said manually operable means and said switching mechanism comprises a resilient insulating strip having one end secured to said conductive strip and having its other end free for engagement with a part of said switching mechanism in response to movement of said rocker to its OFF position.

10. A device as defined in claim 8 wherein said means operatively connecting said manually operable means and said switching mechanism comprises a resilient insulating strip having one end secured to said conductive strip and having its other end free for engagement with a part of said switching mechanism in response to movement of said rocker to its OFF position.

11. A unitary overcurrent protective device for protecting multiphase electrical apparatus comprising in combination:

a casing having side walls and longitudinally spaced end walls and comprised of two longitudinally spaced casing sections with a first section having a plurality of longitudinally spaced compartments and with the second section having a compartment communicating with the first section, a plurality of bimetals mounted in edge to edge relation each in a separate compartment of said first section and defining when undeflected a plane generally perpendicular to said end walls, each bimetal extending generally from top to bottom of said casing, a plurality of bimetal supports secured to said casing each in a separate compartment of said first section, each support supporting the upper end of a separate bimetal, means including a plurality of heaters mounted each in a separate compartment of said first section for heating the associated bimetal in accord with current supplied to the apparatus to be protected, a common member mounted by said casing in said first section for limited pivotal movement about an axis parallel to the plane of said bimetals and perpendicular to said end walls, said common member being pivoted about said axis in response to predetermined deflection of any one of said bimetals, a plate mounted by said casing in the compartment of said second section for limited sliding movement in directions perpendicular to said side walls and to the axis of pivotal movement of said common member, means responsive to pivotal movement of said common member to effect sliding movement of said plate, a switching mechanism in the compartment of said second section operable in response to predetermined sliding movement of said plate resulting from predetermined deflection of any one of said bimetals, first, second and third pairs of fixed and movable contacts in the compartment of said second section, the movable contact of said first pair being mounted on a part of said switching mechanism and normally in engagement with its fixed contact, the movable contact of said first pair being movable out of engagement with its fixed contact in response to operation of said switching mechanism, a manually operable member mounted by said second section for manual movement between a neutral position and ON and OFF positions, said manually operable member being spring biased to the neutral position so that when moved from the neutral position to either the ON or OFF position and released, it returns to the neutral position, conductive means secured to the manually operable member for movement therewith and carrying the two movable contacts of said second and third pairs of contacts, said manually operable member when in a neutral position positioning said conductive means so that the contacts of said second pair are engaged and the contacts of said third pair are spaced, when in its OFF position positioning said conductive means so that the contacts of both said second and third pairs are spaced, and when in its ON position positioning said conductive means so that the contacts of both said second and third pairs are engaged, and means operatively connecting said manually operable member and said switching mechanism to reset said switching mechanism for engaging said first pair of contacts in response to movement of said manually operable member to its OFF position.

12. A device as defined in claim 11 wherein said plate has a hole therein, said means responsive to pivotal movement of said common member comprising means mounted on one end of said common member in the compartment of said second section and having a projection extending loosely into the hole of said plate, and means for effecting limited adjustment of said projection relative to said common member generally in the directions of sliding movement of said plate.

13. A device as defined in claim 11 wherein said means operatively connecting said manually operable member and said switching mechanism comprises a resilient insulating strip having one end secured to said conductive means and having its other end free for engagement with said part of said switching mechanism in response to movement of said manually operable member to its OFF position.

14. A device as defined in claim 11 wherein said bimetals have end portions of reduced width, said supports and said common member having slotted portions which loosely receive said reduced end portions to loosely support said bimetals therebetween.

15. An overcurrent protective device for protecting multiphase electrical apparatus comprising in combination:

a casing having side walls and longitudinally spaced end walls and having a plurality of longitudinally spaced compartments, a plurality of bimetals mounted in edge to edge relation each in a separate compartment and defining when undeflected a plane generally perpendicular to said end walls, each bimetal extending generally from top to bottom of said casing, a plurality of bimetal supports secured to said casing each in a separate compartment, each support supporting the upper end of a separate bimetal, means including a plurality of heaters mounted each in a separate compartment for heating the associated bimetal in accord with current supplied to the apparatus to be protected, a common member mounted by said casing for limited pivotal movement about an axis parallel to the plane of said bimetals and perpendicular to said end walls, said common member being pivoted about said axis in response to predetermined deflection of any one of said bimetals, a plate mounted by said casing for limited sliding movement in directions perpendicular to said side walls and to the axis of pivotal movement of said common member, means responsive to pivotal movement of said common member to effect sliding movement of said plate, a switching mechanism in said casing operable in response to predetermined sliding movement of said plate resulting from predetermined deflection of any one of said bimetals, said switching mechanism including a contact support mounted for pivotal movement about an axis parallel to the axis of pivotal movement of said common member, said contact support being pivoted about its axis of pivotal movement in response to operation of said switching mechanism, and a pair of fixed and movable contacts, said movable contact being mounted on said contact support.

16. A device as defined in claim 15 including a plurality of stops each mounted on a side wall of said casing and engaging the associated bimetals at points generally intermediate their ends, and means for biasing each bimetal against its stop.

17. A device as defined in claim 16 wherein each stop is independently adjustable toward and away from its associated bimetal for calibrating the bimetals.

18. A device as defined in claim 15 wherein each bimetal has end portions of reduced width, each support being mounted adjacent a side wall of the casing and including an angularly extending portion projecting inwardly and upwardly away from the side wall and terminating in a slotted part which loosely receives the upper reduced end portion of the associated bimetal, said common member having slotted portions which loosely receive the lower reduced end portions of said bimetals.

19. A device as defined in claim 15 wherein said plate has a hole therein, said means responsive to pivotal movement of said common member 5 comprising means mounted on one end of said common member and having a projection extending loosely into the hole of said plate, and means for effecting limited adjustment of said projection relative to said common member generally in the directions of sliding movement of said plate.

20. A device as defined in claim 15 wherein the axis of pivotal mounting of said common member and said heater are located on opposite sides of the plane defined by said bimetals.

21. A device as defined in claim 15 wherein said plate includes an end portion projecting outside said casing to permit manual sliding of said plate for manually operating said switching mechanism.

22. A device as defined in claim 18 wherein said plate has a hole therein, said means responsive to pivotal movement of said common member comprising means mounted on one end of said common member and having a projection extending loosely into the hole of said plate, and means for effecting limited adjustment of said projection relative to said common member generally in the directions of sliding movement of said plate.

23. A device as defined in claim 18 wherein the axis of pivotal mounting of said common member and said heaters are located on opposite sides of the plane defined by said bimetals.

24. A device as defined in claim 18 wherein each bimetal has its high expansion side facing the angularly extending portion of the associated support, each support being formed of bimetallic material with its low expansion side facing the high expansion side of the associated bimetal.

25. A device as defined in claim 22 wherein the axis of pivotal mounting of said common member and said heaters are located on opposite sides of the plane defined by said bimetals.

26. A thermally responsive device comprising in combination:

a hollow casing, a common member located in said hollow casing and having an elongated mid portion and two end portions supported by said casing to permit limited pivotal movement of the common member about an axis, said common member having a plurality of raised formations spaced apart along the length of its mid portion with each formation including a slot, a plurality of bimetallic strips each having end portions of reduced width defining shoulders, heating means for heating said bimetallic strips, a plurality of supports located in said hollow casing each directly opposite a separate formation in spaced relation thereto, each support having one portion secured to the casing and another slotted portion loosely receiving one reduced end portion of a separate bimetallic strip, said bimetallic strips being located in a row along the length of the mid portion of the common member in spaced edge to edge relation with the high expansion side of each strip on the same side of the row, each bimetallic strip having its other end portion extending through a separate slot of the common member with the adjacent shoulders of the strip resting on the common member such that the strip is loosely held between the common member and the associated support for limited pivotal movement about an axis parallel to the face of the strip adjacent the slotted portion of the associated support, a stop for each bimetallic strip located intermediate the ends and on the high expansion side of each strip, means for biasing each bimetallic strip against its stop, said supports and said stops restraining deflection of said strips when heated to movement of said other end portions of said strips whereby deflection of any one or more of said strips causes pivotal movement of said common member, a control mechanism, and actuator means mechanically linking said common member with said control mechanism to operate said control mechanism in response to movement of said common member.

27. A device as defined in claim 26 wherein each support is a bimetallic member which deflects when heated to move said one end of the associated bimetallic strip in directions perpendicular to the face of the strip.

28. A device as defined in claim 26 wherein said actuator means includes means mounted on said common member for limited adjustment relative to said common member.

29. A device as defined in claim 26 wherein the axis of pivotal mounting of said common member and said heating means are located on opposite sides of said row of bimetallic strips.

30. A device as defined in claim 26 wherein said one portion of each support is secured to said casing by a separate tubular rivet, each of said stops comprising a screw threaded into a separate tubular rivet.

31. A device as defined in claim 27 wherein said actuator means includes means mounted on said common member for limited adjustment relative to said common member.

32. A device as defined in claim 27 wherein the axis of pivotal mounting of said common member and said heating means are located on opposite sides of said row of bimetallic strips.

33. A device as defined in claim 28 wherein the axis of pivotal mounting of said common member and said heating means are located on opposite sides of said row of bimetallic strips.

34. A device as defined in claim 33 wherein said one portion of each support is secured to said casing by a separate tubular rivet, each of said stops comprising a screw threaded into a separate tubular rivet.

References Cited

UNITED STATES PATENTS

| 1,784,207 | 12/1930 | Stevens et al. | 337—44 |
| 2,029,980 | 2/1936 | Besag | 337—38 |
| 3,015,007 | 12/1961 | Howard | 337—56 |
| 3,038,051 | 6/1962 | Howard | 337—62 |
| 3,265,831 | 8/1966 | Ramsey et al. | 337—48 |

FOREIGN PATENTS

| 872,702 | 7/1961 | Great Britain. |

BERNARD A. GILHEANY, Primary Examiner.

R. L. COHRS, Assistant Examiner.

U.S. Cl. X.R.

200—3; 337—56, 62